(12) United States Patent
Arai et al.

(10) Patent No.: US 7,970,882 B2
(45) Date of Patent: Jun. 28, 2011

(54) MANAGEMENT APPARATUS AND MANAGEMENT METHOD

(75) Inventors: Hitoshi Arai, Yokohama (JP); Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 144 days.

(21) Appl. No.: 12/140,882

(22) Filed: Jun. 17, 2008

(65) Prior Publication Data

US 2009/0271506 A1 Oct. 29, 2009

(30) Foreign Application Priority Data

Apr. 28, 2008 (JP) ................................. 2008-117520

(51) Int. Cl.
G06F 15/173 (2006.01)
G06F 15/16 (2006.01)
G06F 9/46 (2006.01)
(52) U.S. Cl. ........ 709/223; 709/217; 709/218; 709/226; 718/104
(58) Field of Classification Search .................. 709/223, 709/225, 226; 718/105, 104
See application file for complete search history.

(56) References Cited

U.S. PATENT DOCUMENTS

| 7,054,927 B2* | 5/2006 | Ulrich et al. ................... 709/223 |
| 2002/0038314 A1* | 3/2002 | Thompson et al. ........... 707/202 |
| 2003/0037177 A1* | 2/2003 | Sutton et al. ................... 709/316 |
| 2003/0051021 A1* | 3/2003 | Hirschfeld et al. ........... 709/223 |
| 2003/0195942 A1 | 10/2003 | Muhlestein et al. |
| 2005/0060333 A1* | 3/2005 | Katsurabayashi et al. ..... 707/101 |
| 2005/0120058 A1* | 6/2005 | Nishio .......................... 707/200 |
| 2005/0149667 A1* | 7/2005 | Nakayama et al. ........... 711/114 |
| 2005/0223096 A1* | 10/2005 | Shinkai ......................... 709/225 |
| 2007/0204119 A1* | 8/2007 | Murotani et al. ............. 711/161 |
| 2007/0234115 A1* | 10/2007 | Saika .............................. 714/13 |
| 2008/0016121 A1* | 1/2008 | Revah et al. .................. 707/200 |
| 2008/0016311 A1* | 1/2008 | Harada ......................... 711/170 |
| 2008/0040483 A1 | 2/2008 | Nakatani et al. |
| 2008/0104216 A1* | 5/2008 | Ponnappan et al. .......... 709/223 |

FOREIGN PATENT DOCUMENTS

| JP | 2003-223346 A | 8/2003 |
| JP | 2005-267327 A | 9/2005 |
| JP | 2006-202293 A | 8/2006 |
| JP | 2007-257645 A | 10/2007 |

* cited by examiner

*Primary Examiner* — Joseph E Avellino
*Assistant Examiner* — Aftab Nasir Khan
(74) *Attorney, Agent, or Firm* — Sughrue Mion, PLLC

(57) ABSTRACT

Proposed are a management apparatus and a management method capable of facilitating resource management With the provided management apparatus and management method for managing a resource allocated to a virtual node that provides a file sharing service to a client in units of a resource management group configured from a plurality of mutually associated resources, an association between the resources is extracted based on history information of access from the client, and the associated resource management groups are integrated based on the extracted association between the resources. Thus, it is possible to reduce the number of resource management groups to be managed, and resource management is thereby facilitated.

10 Claims, 24 Drawing Sheets

FIG.5

| RESOURCE MANAGEMENT GROUP ID | LAST USE DATE AND TIME | ACTIVE INFORMATION | NAS ID | RESOURCE 1 | RESOURCE 2 | RESOURCE 3 | ... |
|---|---|---|---|---|---|---|---|
| rmng1 | 2007/1/2 12:00 | active | VNAS1 | IP addr1 | NIC1 | LU1 | ... |
| rmng2 | 2007/1/2 12:00 | active | VNAS1 | LU2 | FS2 | share2 | ... |
| rmng3 | 2007/1/2 12:00 | active | VNAS1 | IP addr2 | NIC2 | - | ... |
| ... | ... | ... | ... | ... | ... | ... | ... |
| 40A | 40B | 40C | 40D | 40E | 40E | 40E | 40E |

| ASSOCIATION SOURCE RESOURCE | ASSOCIATED DESTINATION RESOURCE |
|---|---|
| LU1 | FS1 |
| LU2 | FS2 |
| ⋮ | ⋮ |

| NAS_ID | VOLUME NUMBER | MANAGEMENT IP ADDRESS |
|---|---|---|
| NAS1 | OS_LU1 | IP addr1 |
| NAS2 | OS_LU2 | IP addr15 |
| NAS3 | OS_LU3 | IP addr31 |
| ⋮ | ⋮ | ⋮ |

| DATE AND TIME | CLIENT IP | USED RESOURCE |
|---|---|---|
| 2008/02/01 12:00 | 192.168.1.20 | 10.208.1.33, NIC1, FS1, LU1 |
| 2008/02/01 13:00 | 192.168.2.20 | 10.208.2.33, NIC2, FS1, LU1 |
| ⋮ | ⋮ | ⋮ |

| RESOURCE MANAGEMENT GROUP ID | LAST USE DATE AND TIME | ACTIVE INFORMATION | NAS ID | RESOURCE 1 | RESOURCE 2 | RESOURCE 3 | ... |
|---|---|---|---|---|---|---|---|
| rmng1 | 2007/1/2 12:00 | active | VNAS1 | IP addr1 | LU1 | FS1 | ... |
| rmng2 | 2007/1/2 12:00 | active | VNAS1 | IP addr2 | LU2 | FS2 | ... |
| ... | ... | ... | ... | ... | ... | ... | ... |

| ASSOCIATION SOURCE RESOURCE | ASSOCIATED DESTINATION RESOURCE |
|---|---|
| IP addr2 | share2 |
| LU1 | FS1 |
| LU2 | FS2 |
| ⋮ | ⋮ |

| UNUSED RESOURCE LIST | |
|---|---|
| RESOURCE | LAST USE DATE AND TIME |
| FS1<br>LU1 | 2005/12/26 10:00 |
| FS2<br>LU2 | 2003/1/1 12:00 |
| IP addr1<br>NIC1 | 2004/7/10 15:00 |

FIG.18

| RESOURCE MANAGEMENT GROUP ID | LAST USE DATE AND TIME | ACTIVE INFORMATION | NAS ID | RESOURCE 1 | RESOURCE 2 | RESOURCE 3 | ... |
|---|---|---|---|---|---|---|---|
| rmng1 | 2007/1/2 12:00 | inactive | MANAGEMENT NODE | IP addr1 | NIC1 | LU1 | ... |
| rmng2 | 2007/1/2 12:00 | inactive | MANAGEMENT NODE | IP addr2 | NIC2 | LU2 | ... |
| rmng3 | 2007/1/2 12:00 | active | VNAS1 | IP addr3 | NIC2 | LU3 | ... |
| ... | ... | ... | ... | ... | ... | ... | ... |
| 40A | 40B | 40C | 40D | 40E | 40E | 40E | 40E |

| RESOURCE MANAGEMENT GROUP ID | LAST USE DATE AND TIME | ACTIVE INFORMATION | NAS ID | RESOURCE 1 | RESOURCE 2 | RESOURCE 3 | ... |
|---|---|---|---|---|---|---|---|
| rmng1 | 2007/1/2 12:00 | inactive | MANAGEMENT NODE | IP addr1 | NIC1 | LU1 | ... |
| rmng2 | 2007/1/2 12:00 | inactive | MANAGEMENT NODE | IP addr2 | NIC2 | LU2 | ... |
| ... | ... | ... | ... | ... | ... | ... | ... |
| 40A | 40B | 40C | 40D | 40E | 40E | 40E | 40E |

{40}

⇒

| RESOURCE MANAGEMENT GROUP ID | LAST USE DATE AND TIME | ACTIVE INFORMATION | NAS ID | RESOURCE 1 | RESOURCE 2 | RESOURCE 3 | ... |
|---|---|---|---|---|---|---|---|
| rmng1 | 2007/1/2 12:00 | active | VNAS1 | IP addr1 | NIC1 | LU1 | ... |
| rmng2 | 2007/1/2 12:00 | active | VNAS1 | IP addr2 | NIC2 | LU2 | ... |
| ... | ... | ... | ... | ... | ... | ... | ... |
| 40A | 40B | 40C | 40D | 40E | 40E | 40E | 40E |

| IP ADDRESS | INITIAL RECEPTION TIME | LAST RECEPTION TIME | COUNT |
|---|---|---|---|
| IP addr2 | 2008 2/1 00:00:00 | 2008 2/1 00:00:10 | 3 |
| ⋮ | ⋮ | ⋮ | ⋮ |

51A  51B  51C  51D  51

MANAGEMENT APPARATUS AND MANAGEMENT METHOD

CROSS-REFERENCES

This application relates to and claims priority from Japanese Patent Application No. 2008-117520, filed on Apr. 28, 2008, the entire disclosure of which is incorporated herein by reference.

BACKGROUND

The present invention relates to a management apparatus and a management method, and can be suitably applied to a NAS (Network Attached Storage) server that provides a virtual NAS to a client.

Conventionally, as methods for managing a plurality of resources in a plurality of host environments, there are the methods proposed in Japanese Patent Laid-Open Publication No. 2006-202293 and Japanese Patent Laid-Open Publication No. 2007-257645. With these methods, software resources and hardware resources existing in a plurality of hosts connected to a network are associated and managed in a management server.

In addition, Japanese Patent Laid-Open Publication No. 2005-267327 and Japanese Patent Laid-Open Publication No. 2003-223346 propose methods of dividing resources in a single physical NAS server to create a virtual NAS (hereinafter referred to as a "virtual NAS").

SUMMARY

Incidentally, as the resources to be used by a virtual NAS set in a NAS server, there are hardware resources such as a logical volume (LU: Logical Unit), an NIC (Network Interface Card) and an HBA (Host Bus Adapter), and software resources such as a file system and an IP (Internet Protocol) address.

Although these resources are associated between the hardware resources and the software resources, the association itself is a simple association of "logical volume and file system" or "NIC and IP address." In addition, this association is performed in a closed environment in a single virtual NAS.

Thus, according to a conventional management method of virtual NAS resources, there are numerous management targets (pairs of associated resources, and individual resources that are not associated with other resources), and resource management is required for each virtual NAS. Consequently, there is a problem in that the resource management is complicated and the management cost will increase.

In addition, when conventionally releasing a resource from the virtual NAS, it was necessary to cut the association in the virtual NAS, and it was not possible to manage the resources while maintaining the association between the resources. Thus, when recreating a virtual NAS that once released its resources for deletion for the like, the user needs to reallocate the individual resources to the virtual NAS, and there is a problem in that much labor and time are required for recreating the virtual NAS.

The present invention was made in view of the foregoing points. Thus, an object of the present invention is to propose a management apparatus and a management method capable of facilitating resource management.

In order to achieve the foregoing object, the present invention provides a management apparatus for managing resources allocated to a virtual node that provides a file sharing service to a client in units of a resource management group configured from a plurality of mutually associated resources. This management apparatus comprises an association extraction unit for extracting an association between the resources based on history information of access from the client, and an integration unit for integrating the associated resource management groups based on the association between the resources extracted with the association extraction unit.

Consequently, it is possible to reduce the number of resource management groups to be subject to resource management.

The present invention additionally provides a management method for managing resources allocated to a virtual node that provides a file sharing service to a client in units of a resource management group configured from a plurality of mutually associated resources. This management method comprises a first step of extracting an association between the resources based on history information of access from the client, and a second step of integrating the associated resource management groups based on the extracted association between the resources.

Consequently, it is possible to reduce the number of resource management groups to be subject to resource management.

According to the present invention, it is possible to reduce the number of resources to be subject to resource management, and thereby possible to realize a management apparatus and a management method capable of facilitating resource management.

DESCRIPTION OF DRAWINGS

FIG. 5 is a chart showing the configuration of a resource management table;

FIG. 6 is a chart showing the configuration of a resource association table;

FIG. 7 is a chart showing the configuration of a virtual NAS management table;

FIG. 9 is a chart showing the configuration of an access log management table;

FIG. 11 is a chart explaining the resource association processing;

FIG. 12 is a chart explaining the resource association processing;

FIG. 14 is a schematic diagram schematically showing a list display example of unused resources;

FIG. 18 is a chart explaining the virtual NAS recreation processing;

FIG. 23 is a chart explaining the virtual NAS recreation processing;

FIG. 25 is a chart showing the configuration of a monitoring table.

DETAILED DESCRIPTION

An embodiment of the present invention is now explained in detail with reference to the attached drawings.

(1) Configuration of Information Processing System in Present Embodiment

Figure 1:
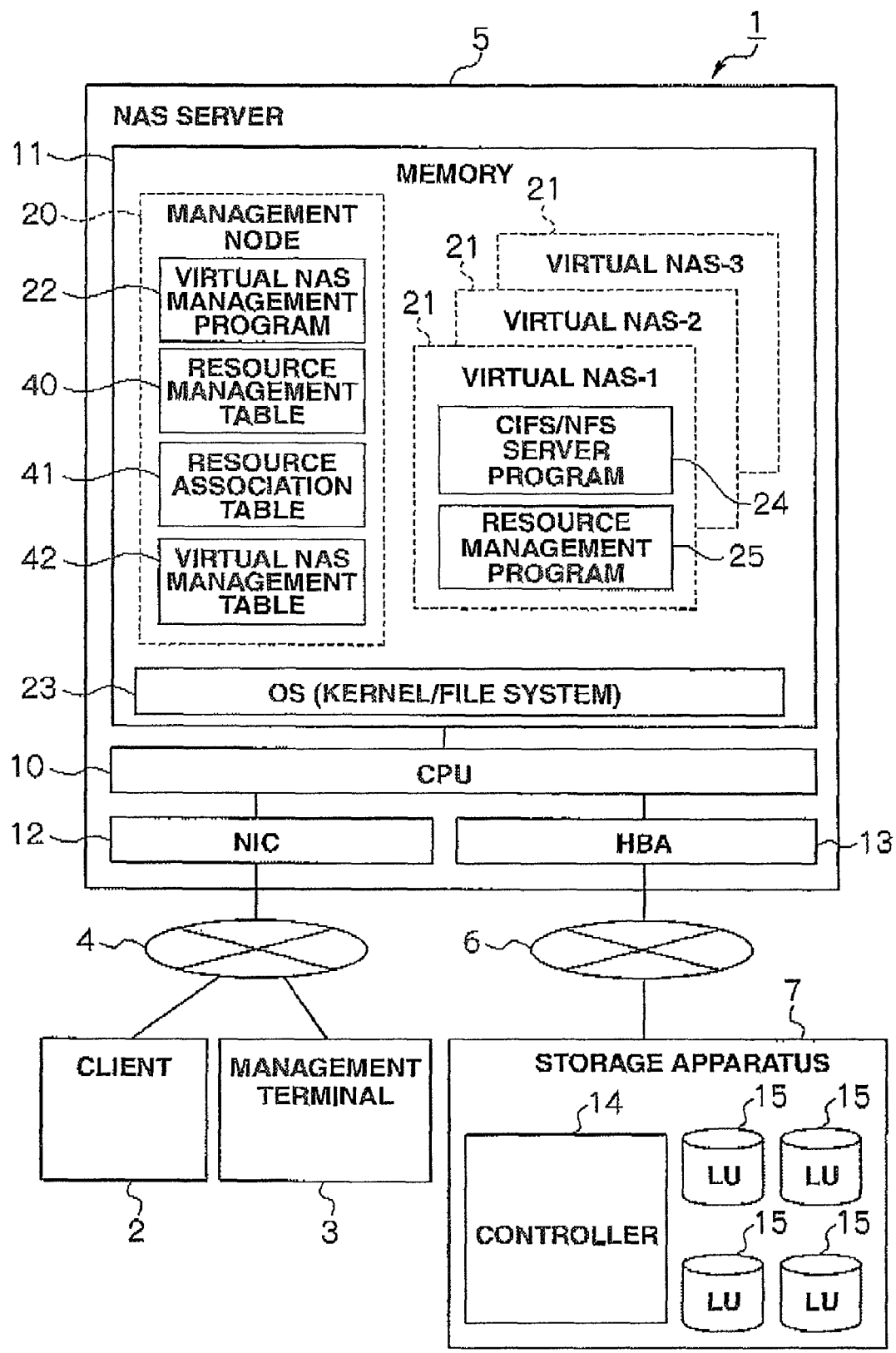
FIG. 1 is a block diagram schematically showing the overall configuration of an information processing system according to an embodiment of the present invention.

FIG. 1 shows the overall information processing system 1 according to the present embodiment. The information processing system 1 is configured by a client 2 and a management terminal 3 being connected to a NAS server 5 via a first network 4 such as a LAN (Local Area Network), and a NAS server 5 being connected to a storage apparatus 7 via a second network 6 such as a fibre channel.

The client 2 and the management terminal 3 are respectively computer devices comprising information processing resources such as a CPU and a memory, and configured from a personal computer, a workstation, a mainframe or the like. The client 2 and the management terminal 3 comprise information input devices (not shown) such as a keyboard, a switch, a pointing device, and a microphone, and information output devices (not shown) such as a monitor display and a speaker.

The NAS server 5 is a server that provides a file sharing service to the client 2, and comprises a CPU 10, a memory 11, an NIC 12 and an HBA 13.

The CPU 10 is a processor that governs the operational control of the overall NAS server 5. As a result of the CPU 10 executing various control programs stored in the memory 11, the NAS server 5 is thereby able to perform various types of processing. The memory 11 is used for storing various control programs, and as a work memory of the CPU 10.

The NIC 12 is an interface for performing protocol control during the communication with the client 2 and the management terminal 3, and the HBA 13 is an interface for performing protocol control during the communication with the storage apparatus 7.

The storage apparatus 7 is configured from a plurality of disk units (not shown) for respectively storing data, and a controller 14 for controlling the input and output of data to and from the disk units.

Each disk unit is configured by having a built-in expensive disk such as a SCSI (Small Computer System Interface) disk, or an inexpensive disk such as a SATA (Serial AT Attachment) disk or an optical disk. Each of these disk units is operated in RAID (Redundant Array of Inexpensive Disks) format with the controller 14. One or more logical volumes 15 are set in a physical storage area provided by one or more disk units, and data is stored in these logical volumes 15.

The controller 14 is configured from a network interface for communicating with the NAS server 5 via the second network 6, a disk interface for communicating with the respective disk units, and a cache memory for temporarily storing data to be input and output to and from the logical volumes 15.

(2) Resource Management Method in Present Embodiment (2-1) Outline and Configuration of Various Tables The resource management method according to the present embodiment loaded in the NAS server 5 is now explained. With the information processing system 1 of this embodiment, logical partitioning, which is one type of virtualization technology, can be used to create a plurality of logical blocks in the NAS server 5, allocate one of the created logical blocks to the management node 20, and allocate the other logical blocks to the virtual NAS 21.

Here, a "management node" is a node for managing the virtual NAS 21. The management node 20 is configured from a virtual NAS management program 22 for allocating, separating and releasing the resources in relation to the virtual NAS 21, and a kernel portion and a file system portion of an OS (Operating System) 23. As a result of the management node 20 allocating resources to the virtual NAS 21, the virtual NAS 21 will be able to use the resources allocated thereto.

A "virtual NAS" referred to in the ensuing explanation is a virtual node set in the NAS server 5 for providing a file sharing service to the client 2. The virtual NAS 21 is configured from the file system portion of the OS 23, a CIFS (Common Internet File System)/NFS (Network File System) server, program 24 for providing a file sharing service, and a resource management program 25 for managing the resources allocated to the self-virtual NAS 21. Each virtual NAS 21 uses the resources allocated to itself to provide a file sharing service to the client 2.

A logical volume 15 for one system (hereinafter appropriately referred to as a "system logical volume") is associated with the management node 20 and each virtual NAS 21, and the OS 23 and the program (virtual NAS management program 22, CIFS/NFS server program 24 and/or resource management program 25) configuring the management node 20 or the virtual NAS are stored in the system logical volumes 15. These programs are read into the memory 11 from the system logical volume 15 when the NAS server S is booted and, by these programs being executed by the CPU 10 in time-sharing, the management node 20 and the virtual NAS 21 are created in the corresponding logical block.

Figure 2:
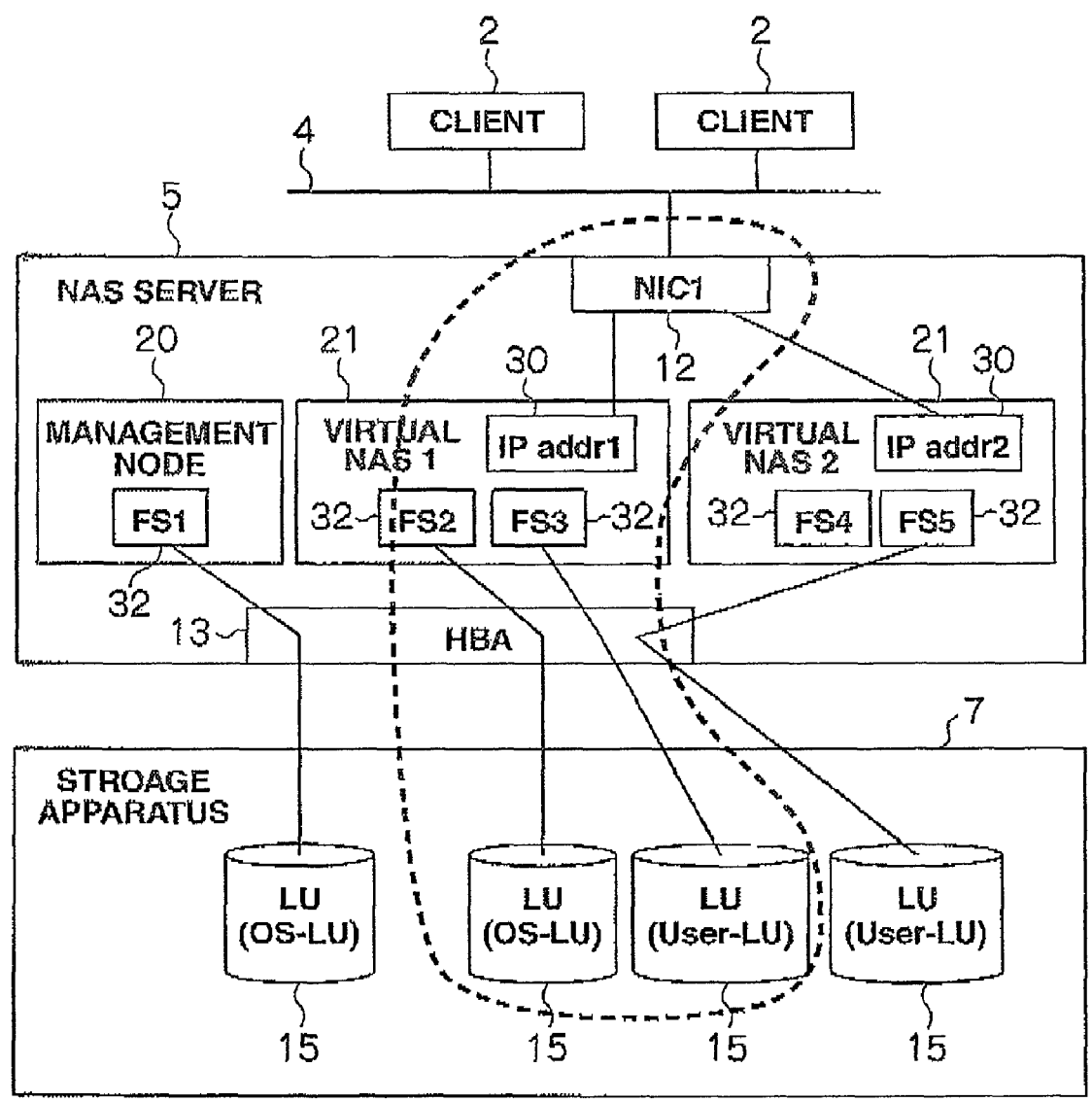
FIG. 2 is a block diagram explaining the resources in then information processing system.

As the resources to be allocated to the management node 20 and the virtual NAS 21, as shown in FIG. 2, there are an NIC 12 ("NIC"), an IP address 30 ("IP addr"), a file sharing 31 ("Share"; refer to FIG. 4), a file system 32 ("FS"), an HBA 13 ("HBA"), a logical volume 15 ("LU"), and the like. Among the above, as the IP address 30, there is a management IP address ("mgnt IP addr") 30 to be used by the OS 23 of the management node 20 and the virtual NAS 21, and an IP address ("IP addr") 30 to be used by the client 2 for inputting and outputting data. In addition, as the logical volume 15, there is the foregoing system logical volume ("OS LU") 15 and a user logical volume 15 ("User_LU") to be provided to the client 2.

Figure 3:
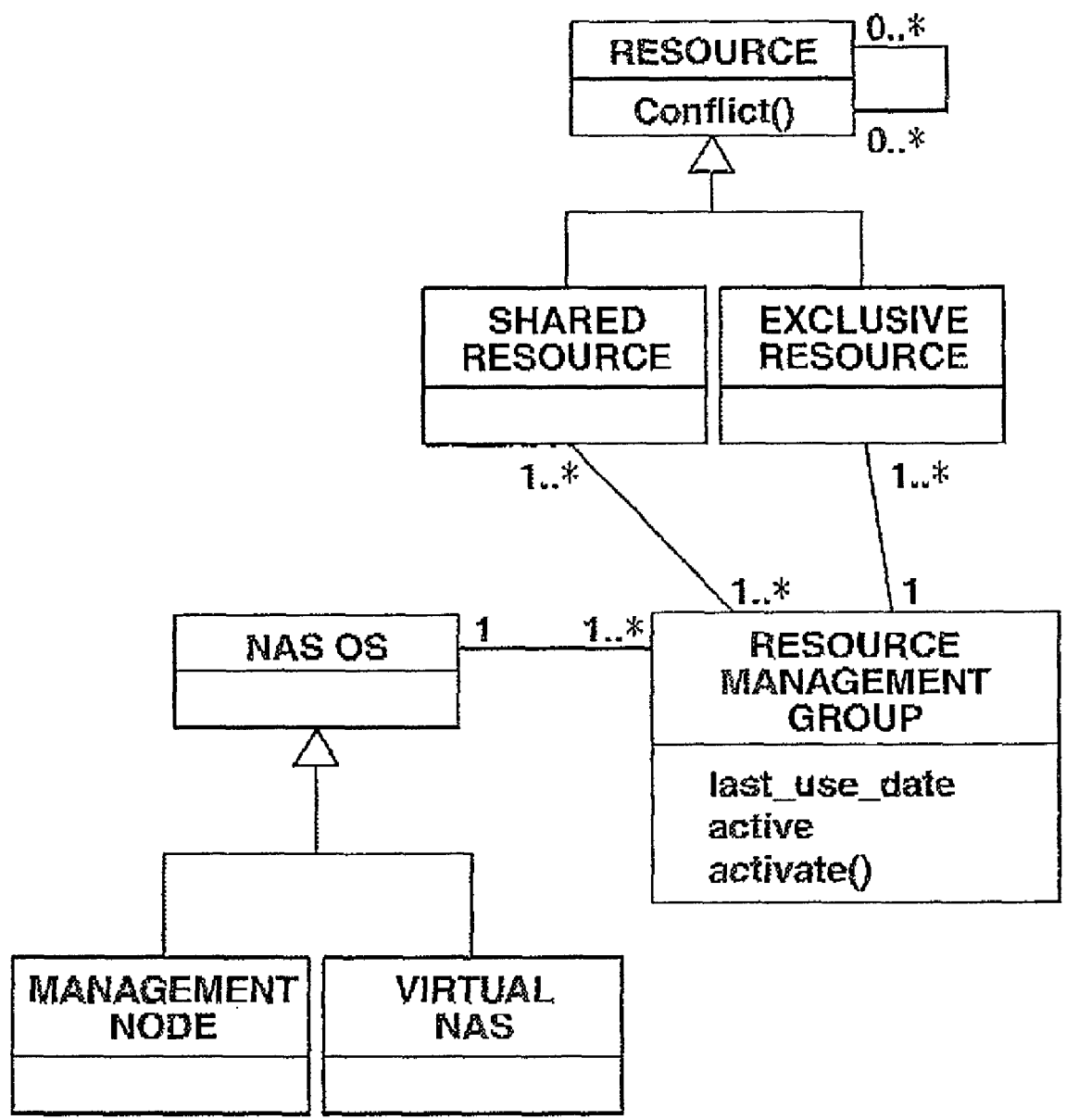
FIG. 3 is a class diagram showing the data configuration of the resources in the information processing system.

Among the foregoing resources, the NIC 13, the file sharing 31 and the HBA 14 are shared resources to be shared and used by a plurality of virtual NASes 21, and the IP address 30, the file sharing 31 and the logical volume 15 are exclusive resources to be exclusively used by the virtual NAS 21 of the allocation destination. The data structure of the resources may be represented as a class diagram as shown in FIG. 3.

Figure 4:
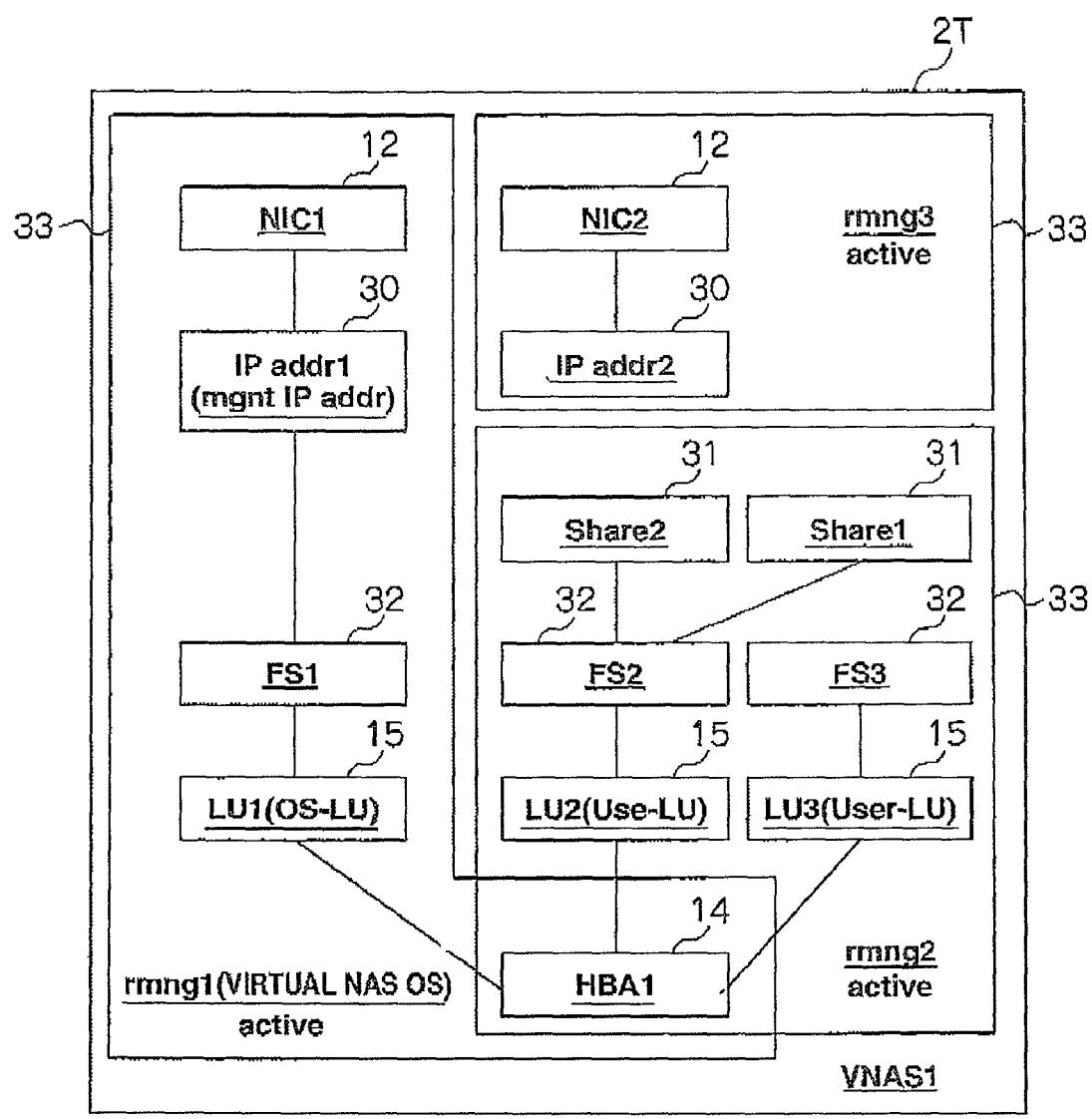
FIG. 4 is a conceptual diagram explaining the association among the resources.

Meanwhile, these resources, as shown in FIG. 4, may also be associated with other resources based on the user's setting such as "NIC1-IP addr1-FS1-LU1-HBA1," "NIC2-IP addr2" and "Share2-FS2-LU2-HBA1."

Each of the mutually associated resources is managed as a single group (hereinafter referred to as a "resource management group") 33. Each resource management group 33 belongs to the management node 20 or one virtual NAS 21. The resource management groups 33 exist independently, and are managed in a status that is unrelated to the other resource management groups 33. FIG. 4 shows the association of the resources in the OS 23 of the NAS server 5, and does not mean that the hardware is physically connected in this order.

Nevertheless, in reality, there are cases where the client 2 makes access via the IP address 30, which is an access to the file sharing 31. Thus, for example, in FIG. 4, association also exists between the IP address 30 indicated as "IP addr2" of the resource management group 33 indicated as "rmng2" and the file sharing 31 indicated as "Share1" of the resource management group 33 indicated as "rmng3." Thus, the resource management group 33 indicated as "rmng2" and the resource management group 33 indicated as "rmng3" can be integrated and managed as one resource management group 33.

Accordingly, it is considered that by finding an association between resources that is not based on the user's setting and integrating the two resource management groups 33 respectively containing resources having this association into one resource management group 33, the number of resources to be subject to resource management can be reduced.

Thus, the NAS server 5 of this embodiment is loaded with a resource management function that associates the resource management groups 33 according to the association between the resources based on the data access from the client 2.

As a means for realizing this kind of resource management function, as shown in FIG. 1, the management node 20 of the NAS server 5 retains a resource management table 40, a resource association table 41 and a virtual NAS management table 42.

The resource management table 40 is a table to be used by the management node 20 for consolidating the respective resource management groups 33 and, as shown in FIG. 5, is configured from a management resource group ID column 40A, a last use date and time column 40B, an active information column 40C, a NAS_ID column 40D, and a plurality of resource ID columns 40E.

The resource management group 10 column 40A stores the identifier (hereinafter appropriately referred to as the "resource management group ID") assigned to the corresponding resource management group 33, and the last use date and time column 40B stores the date and time that the resource management group 33 was last used.

The active information column 40C stores information showing whether the resource management group 33 is of an active status (status of being able to provide service), and the NAS_ID column 40D stores the identifier (hereinafter appropriately referred to as the "NAS_ID") of the management node 20 or the virtual NAS 21 to which the resource management group 33 belongs. The resource column 40E stores the ID assigned to each resource belonging to the resource management group 33.

Accordingly, the example illustrated in FIG. 5 shows that at least three resource management groups 33 of "rmng1," "rmng2" and "rmng3" belong to the virtual NAS 21 assigned with the NAS_ID of "VNAS1." Among the above, regarding the resource management group 33 indicated as "rmng1,"
FIG. 5 shows that the last use date and time is "2007/1/2 12:00," it is currently in an "active" status, and comprises the IP address 30 indicated as "IP addr1," the NIC 12 indicated as "NIC 1" and the logical volume 15 indicated as "LU1" as resources.

The resource association table 41 is a table to be used by the management node 20 for managing the association between the resources and, as shown in FIG. 6, is configured from an association source resource column 41A and an association destination resource column 41B.

The association source resource column 41A stores the identifier of the resources of the association source, and the association destination resource column 41B stores the identifier of the resources associated with the resources of the association source. Accordingly, the example illustrated in FIG. 6 shows that the logical volume 15 indicated as "LU1" and the file system 32 indicated as "FS1" are associated, and the logical volume 15 indicated as "LU2" and the file system 32 indicated as "FS2" are associated.

The virtual NAS management table 42 is a table to be used by the management node 20 for managing the virtual NAS 21 set in the NAS server 5 and, as shown in FIG. 7, is configured from a NAS_ID column 42A, a volume number column 42B, and a management IP address column 42C.

The NAS_ID column 42A stores the NAS_ID of each virtual NAS 21 set in the NAS server 5, and the volume number column 42B stores the volume ID of the system logical volume 15 allocated to the corresponding virtual NAS 21. The management IP address column 42C stores the management IP address 30 (FIG. 4) allocated to the system of the virtual NAS 21.

Accordingly, the example illustrated in FIG. 7 shows that the virtual NASes 21 of "NAS1," "NAS2," "NAS3," ... are set in the NAS server 5 and, for instance, the system logical volume 15 indicated as "OS_LU1" and the management IP address 30 indicated as "mgnt IP addr1" are allocated to the virtual NAS 21 indicated as "NAS1."

(2-2) Resource Association Processing

Among the resource management functions described above, the resource associating processing of associating the related resources among the resources that have not been associated based on the user's operation is now explained. In the ensuing explanation, let it be assumed in the initial status where there is no access from the client 2, the respective resources are associated based on the users setting as shown in FIG. 4 to FIG. 6.

Figure 8:
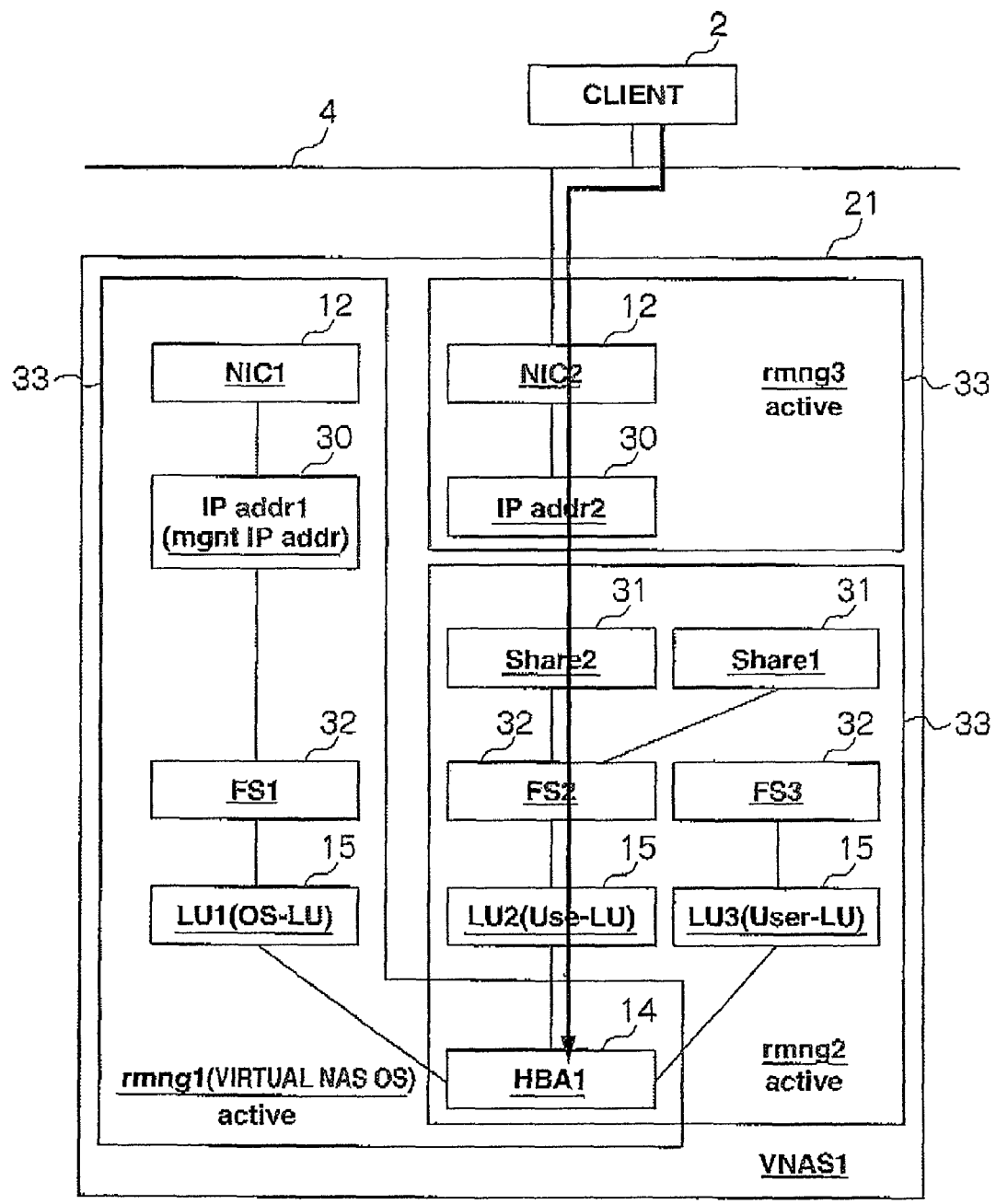
FIG. 8 is a conceptual diagram showing the usage sequence of resources during data access.

When there is data access from the client 2 to the physical logical volume 15 that sequentially passes through the NIC 12 indicated as "NIC2" and the IP address 30 indicated as "IP addr2" belonging to the resource management group 33 indicated as "rmng3," and the file sharing 31 indicated as "Share2," the file system indicated as "FS2," the logical volume indicated as "LU2" and the HBA 14 indicated as "HBA1" belonging to the resource management group 33 indicated as "rmng2" as shown in FIG. 8, the CPU 10 (FIG. 1) of the NAS server 5 manages that access log using the access log management table 50 shown in FIG. 9.

In reality, the access log management table 50 is configured, as shown in FIG. 9, from a date and time column 50A, a client IP column 50B and a used resource column 50C. The date and time column 50A registers the date and time of the data access from the client 2 to the logical volume 2 provided by the storage apparatus 7 (FIG. 1), and the client ID column 50B stores the identifier of the client (hereinafter appropriately referred to as the "client ID") that made the data access. The used resource column 50C stores the identifying information of the respective resources used in the data access.

Accordingly, the example illustrated in FIG. 8 shows that, at "2008/02/01 12:00," the client 2 assigned with a client ID of "192.168.1.20" accessed the logical volume 15 indicated as "LU1" via the IP address 30 indicated as "10.208.1.33," the NIC 12 indicated as "NIC 1" and the file system 32 indicated as "FS1."

Figure 10:
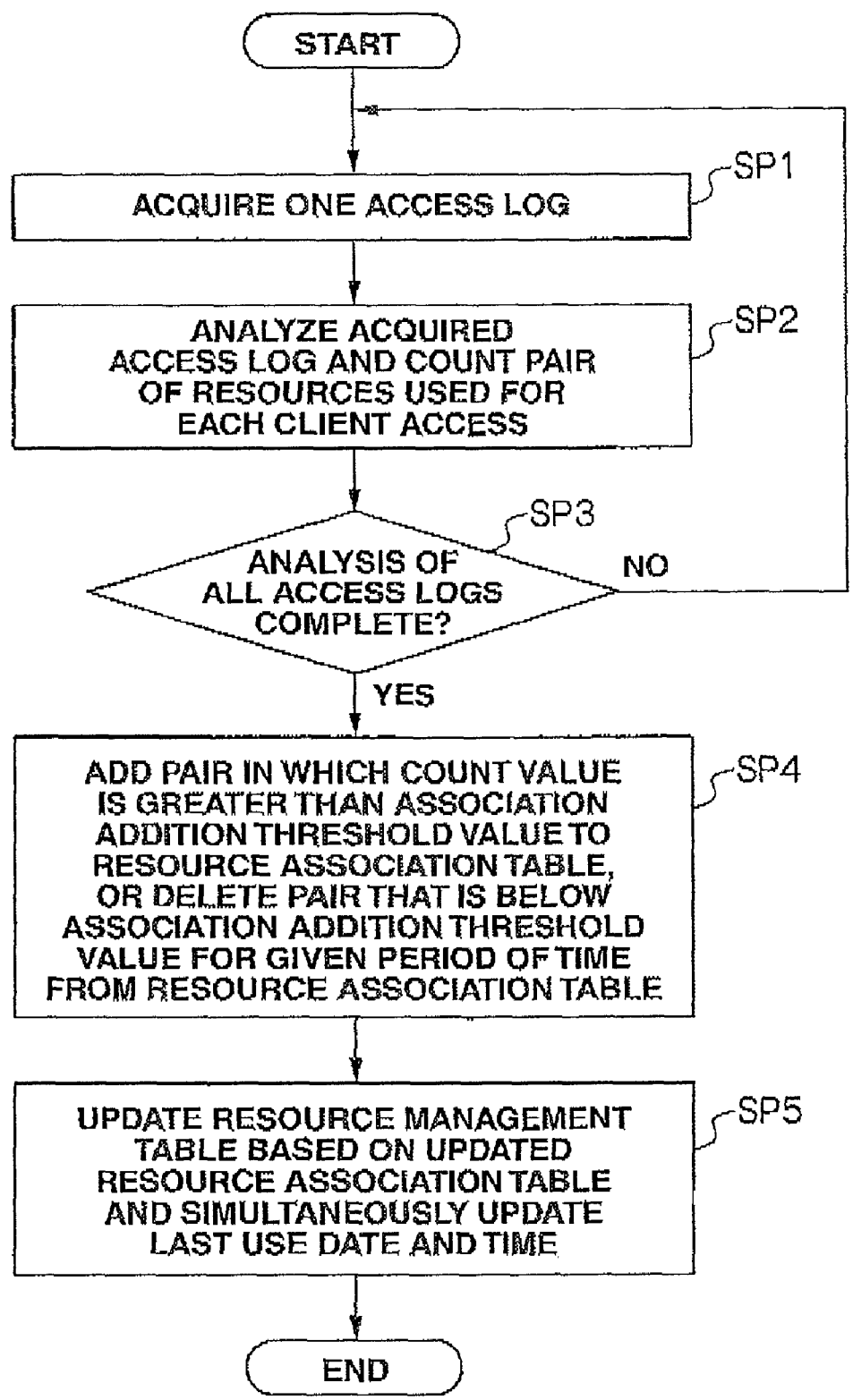
FIG. 10 is a flowchart showing the processing routine of the resource association processing.

Then, the CPU 10 refers to the access log management table 50 based on the virtual NAS management program 22 (FIG. 1) of the management node 20 stored in the memory 11, and associates the associated resources by executing the resource association processing shown in FIG. 10 periodically and independently for each virtual NAS 21.

Specifically, when the CPU 10 starts the resource association processing shown in FIG. 10, it foremost reads one access log worth of data (one record worth of data of the access log management table 50) from the access log management table 50 (SP1).

Subsequently, in order to analyze the access log read from the access log management table 50 at step SP1 and count the use frequency of a combination of two consecutive resources (hereinafter referred to as a "resource pair"), the CPU 10 increments one for each resource pair used in the data access (SP2).

For instance, in the example of FIG. 8, the CPU 10 will increment one for each of the following resource pairs; namely, the resource pair configured from the NIC 12 indicated as "NIC2" and the IP address 30 indicated as "IP addr2," the resource pair configured from the IP address 30 indicated as "IP addr2" and the file sharing 31 indicated as "Share2," the resource pair configured from the file sharing indicated as "Share2" and the file system 32 indicated as "FS2," the resource pair configured from the file system 32 indicated as "FS2" and the logical volume 15 indicated as "LU2" and the resource pair configured from the logical volume 15 indicated as "LU2" and the HBA 13 indicated as "HBA1."

Subsequently, the CPU 10 determines whether the processing at step SP2 has been performed regarding all access logs registered in the access log management table 50 (SP3). The CPU 10 returns to step SP2 upon obtaining a negative result in this determination, and thereafter repeats the same processing while sequentially selecting different access logs at step SP2 until it obtains a positive result at step SP3.

When the CPU 10 obtains a positive result at step SP3 as a result of the processing at step SP2 being performed to all access logs registered in the access log management table 50, and there is a resource pair, in which the count value thereof among the count values counted for each resource pair at step SP2 exceeds a predetermined threshold value (hereinafter referred to as the "association addition threshold value"), that is not registered in the resource association table 41 (FIG. 6), the CPU 10 registers that resource pair in the resource association table 41. If there is a resource pair, in which the count value thereof among the count values counted for each resource pair at step SP2 is below the association addition threshold value for a given period of time, the CPU 10 deletes that resource pair from the resource association table 41 (SP4).

For example, in the example of FIG. 4 to FIG. 6, if the count value of the resource pair configured from the IP address 30 indicated as "IP addr2" and the file sharing 31 indicated as "Share2" exceeds the association addition threshold value, as shown in FIG. 12, the resource pair configured from the IP address 30 indicated as "IP addr2" and the file sharing 31 indicated as "Share2" is added to the resource association table 41.

Subsequently, the CPU 10 updates the resource management table 40 (FIG. 5) so as to integrate the resource management group 33 containing one of the two associated resources, and the resource management group 33 containing the other associated resource based on the resource association table 41 updated at step SP4 (SP5).

Figure 13:
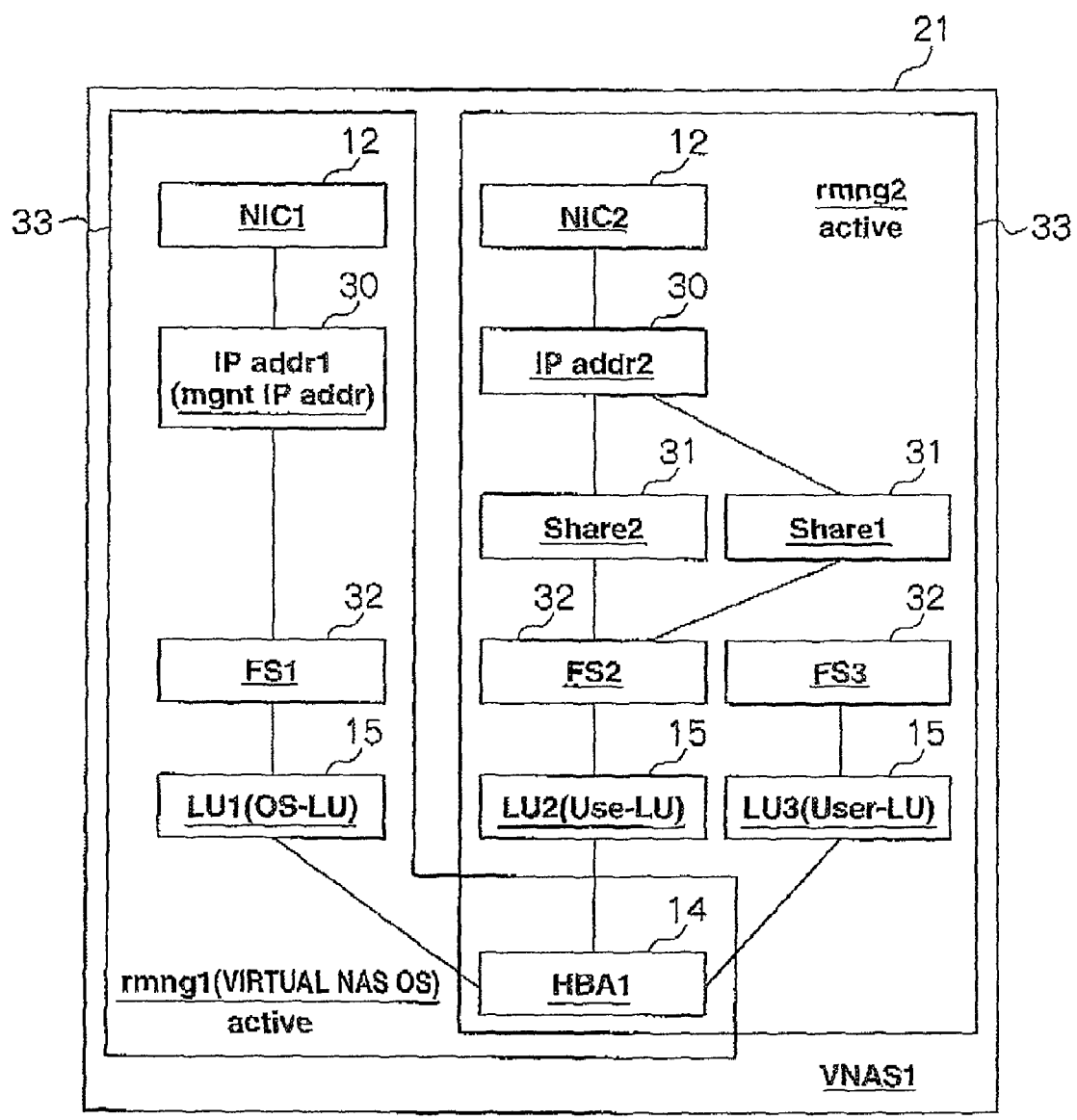
FIG. 13 is a conceptual diagram explaining the resource association processing.

For instance, in the example of FIG. 12, since the IP address 30 indicated as "IP addr2" configuring the resource pair newly added to the resource association table 41 belongs to the resource management group 33 indicated as "rmng3" and the file sharing 31 indicated as "Share2" belongs to the resource management group 33 indicated as "rmng2," as shown in FIG. 13, the resource management group 33 indicated as "rmng3" and the resource management group 33 indicated as "rmng2" can be integrated into one resource management group.

Thus, in the foregoing case, the CPU 10 integrates the resource management group 33 indicated as "rmng3" and the resource management group 33 indicated as "rmng2" into one resource management group, and accordingly updates the resource management table 33 as shown in FIG. 11. FIG. 11 shows an example where the resource management group indicated as, "rmng3" is absorbed by the resource management group indicated as "rmng2." As evident from comparing FIG. 5 and FIG. 11, it is possible to reduce the number of resource management groups 33 to be managed by integrating the resource management groups 33 as described above.

In addition to the integration of the resource management groups 33, the CPU 10 changes the last use date and time column of the integrated resource management groups 33 to the current date and time (SP5), and thereafter ends this resource association processing.

Incidentally, if there are resource pairs (or the respective resources configuring the resource pairs) with a low use frequency or resource pairs (or the respective resources configuring the resource pairs) that have not been used for a given period of time based on the use frequency for each resource pair counted in the resource association processing described above, these may be displayed and presented to the user as a list of unused resources as shown in FIG. 14 when the user is to operate the management terminal 3 and create a new virtual NAS 21, and urge the use of such resource pairs (or the respective resources configuring the resource pairs).

(2-3) Virtual NAS Deletion Processing

The specific processing contents of the CPU 10 of the NAS server 5 concerning the virtual NAS deletion processing for deleting a virtual NAS 21 set in the NAS server 5 are now explained. In the ensuing explanation, let it be assumed that the respective resources of the NAS server are associated as shown in FIG. 11 to FIG. 13 as a result of the foregoing resource association processing.

When the virtual NAS 21 is no longer being used and it is understood that the virtual NAS 21 will not be used in the future either, all resources allocated to that virtual NAS 21 may be released. However, since the released resources will be subsequently allocated to another virtual NAS 21, if there is a possibility that such resources may be used in the virtual NAS 21 that is no longer used, it would be better not to release the resources. Nevertheless, even in the foregoing case, the resources configuring the resource management group 33 used by the OS 23 of the virtual NAS 21 can be released, and the effectively utilization of the resources can be sought thereby.

Thus, in this embodiment, when deleting a virtual NAS 21 set in the NAS server 5, only the resources used by the OS 23 of the virtual NAS 21 are released, and the resources of the virtual NAS 21 used by the client 2 are not released and the management thereof is transferred to the management node 20.

Figure 15:
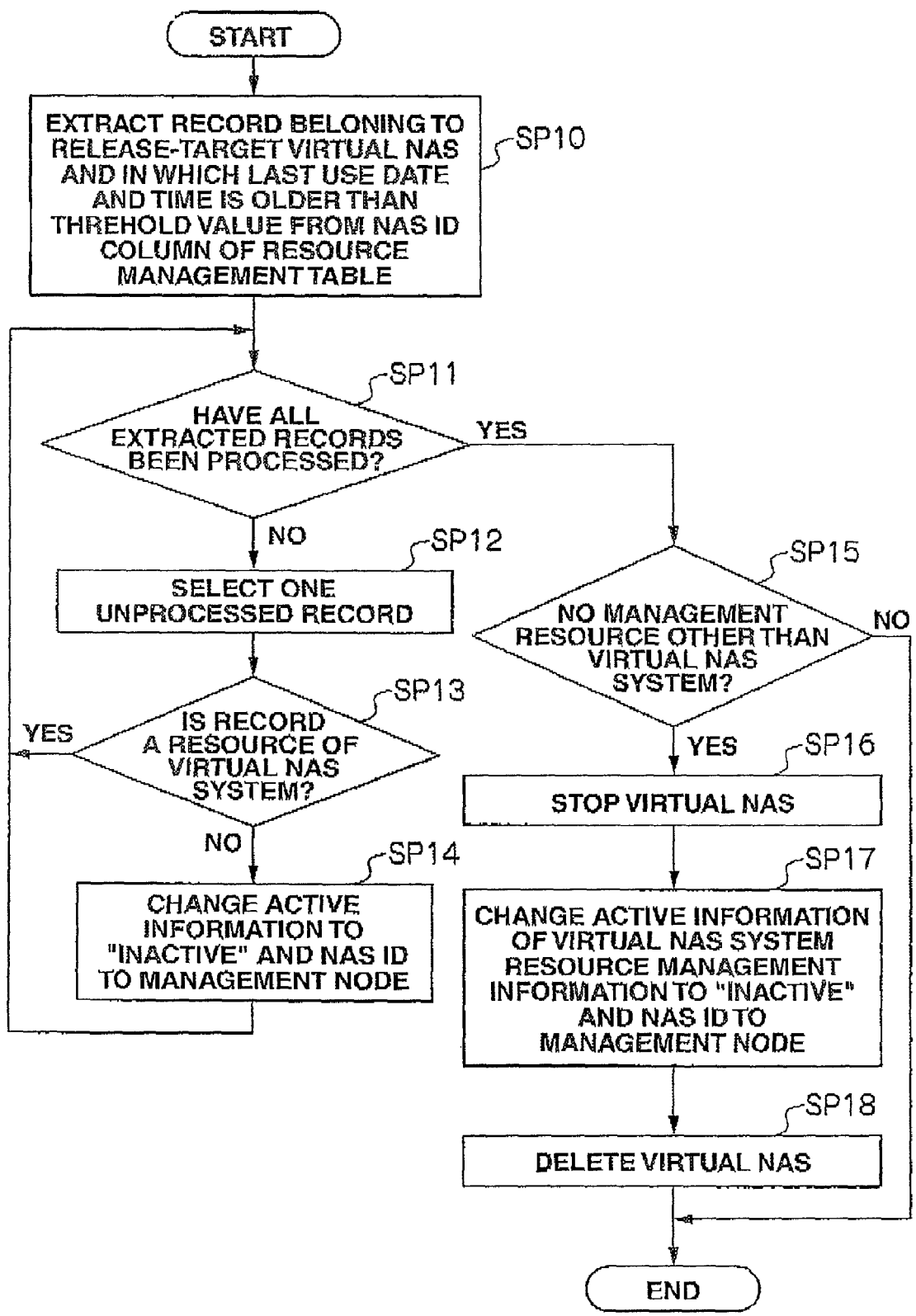
FIG. 15 is a flowchart showing the processing routine of the virtual NAS deletion processing.

FIG. 15 shows the specific processing contents of the CPU 10 of the NAS server 5 concerning this kind of virtual NAS deletion processing.

When the user operates the management terminal 3, designates the intended virtual NAS 21 set in the NAS server 5, and inputs instructions for deleting such virtual NAS 21, a deletion command of that virtual NAS 21 (hereinafter referred to as the "virtual NAS deletion command") is sent from the management terminal 3 to the NAS server 5. The CPU 10 of the NAS server 5 that received this virtual NAS deletion command deletes that virtual NAS 21 from the NAS server 5 by executing the virtual NAS deletion processing shown in FIG. 15 based on the resource management program 25 (FIG. 1) of the virtual NAS 21 designated by the user as a deletion target.

In other words, when the CPU 10 starts this virtual NAS deletion processing, it foremost extracts all records of the resource management table 40 (FIG. 11) in which the NAS_ID of the deletion-target virtual NAS 21 designated by the user is stored in the NAS_ID column 40D (FIG. 11), and in which the last use date and time stored in the last use date and time column 40B is older than a predetermined threshold value (hereinafter referred to as the "last use date and time threshold value") (SP10).

Subsequently, the CPU 10 determines whether the processing of step SP12 to step SP14 described later has been performed to all records extracted at step SP10 (SP11). If the CPU 10 obtains a negative result in this determination, it selects one recorded that has not yet been subject to the processing of step SP12 to step SP14 (SP12), and determines whether the resource management group 33 corresponding to that record is a resource management group 33 being used by the OS 23 (FIG. 1) of the virtual NAS 21 (SP13).

For instance, in the example of FIG. 11 to FIG. 13, since the resource management group 33 indicated as "rmng1" is a resource management group 33 to be used by the OS 23 of the virtual NAS 21 upon accessing the system logical volume 15, if a record corresponding to this resource management group 33 is selected at step SP12, the CPU 10 will obtain a positive result in the determination at step SP13. In addition, since the resource management group 33 indicated as "rmng2" in FIG. 11 to FIG. 13 is a resource management group 33 to be used by the client 2 upon accessing the user logical volume 15, if a record corresponding to this resource management group 33 is selected at step SP12, the CPU 10 will obtain a negative result in the determination at step SP13.

Consequently, the CPU 10 returns to step SP11 upon obtaining a positive result in the determination at step SP13.

Figure 16:
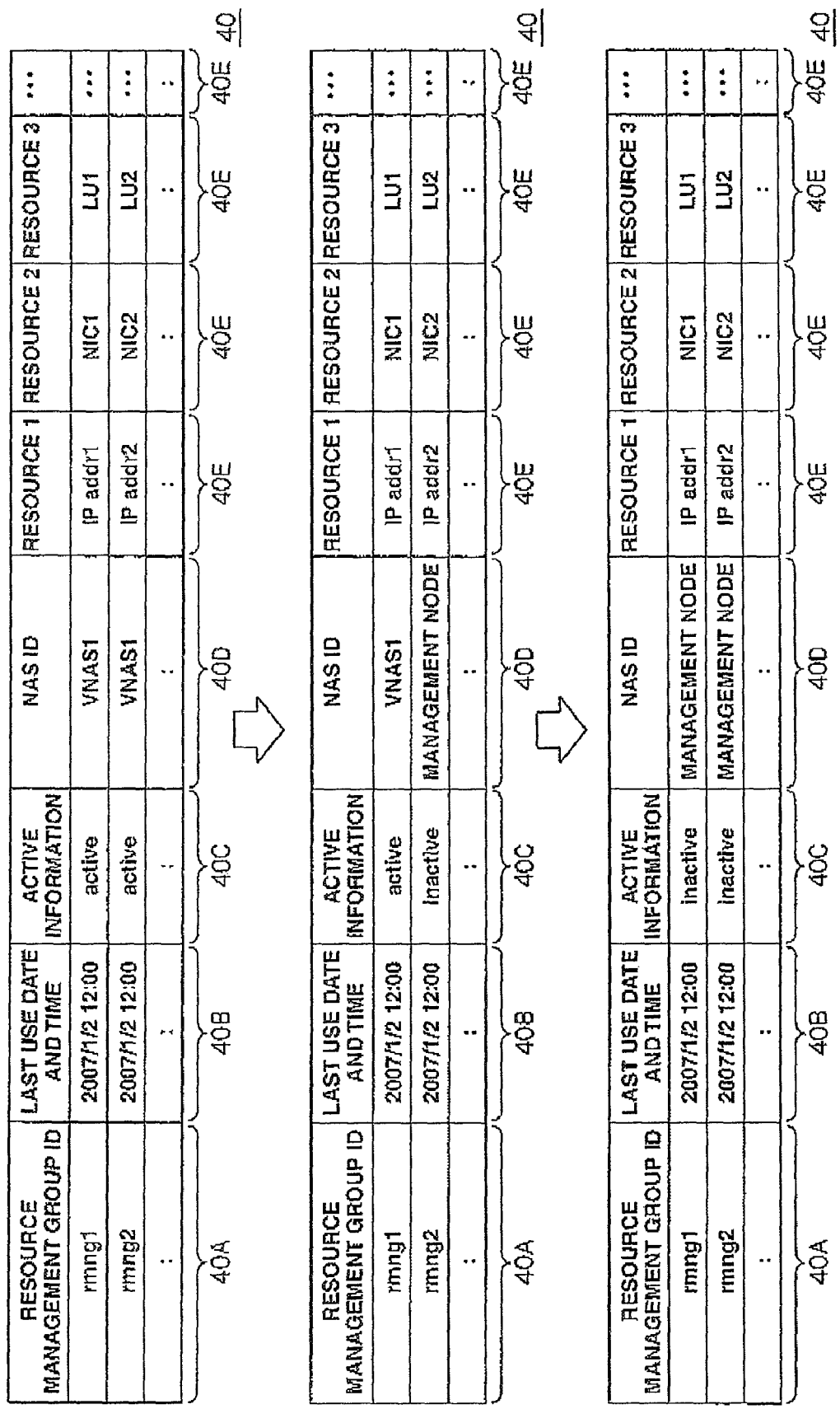
FIG. 16 is a chart explaining the virtual NAS deletion processing.

Meanwhile, if the CPU 10 obtains a negative result in the determination at step SP13, as shown in the upper row and middle row of FIG. 16, the active information stored in the active information column 40C of the record selected at step SP12 in the resource management table 40 is changed from "active" showing an available status to "inactive" showing an unavailable status. The CPU 10 additionally stores the NAS_ID of the management node 20 in the NAS_ID column 40D of that record (SP14).

Figure 17:
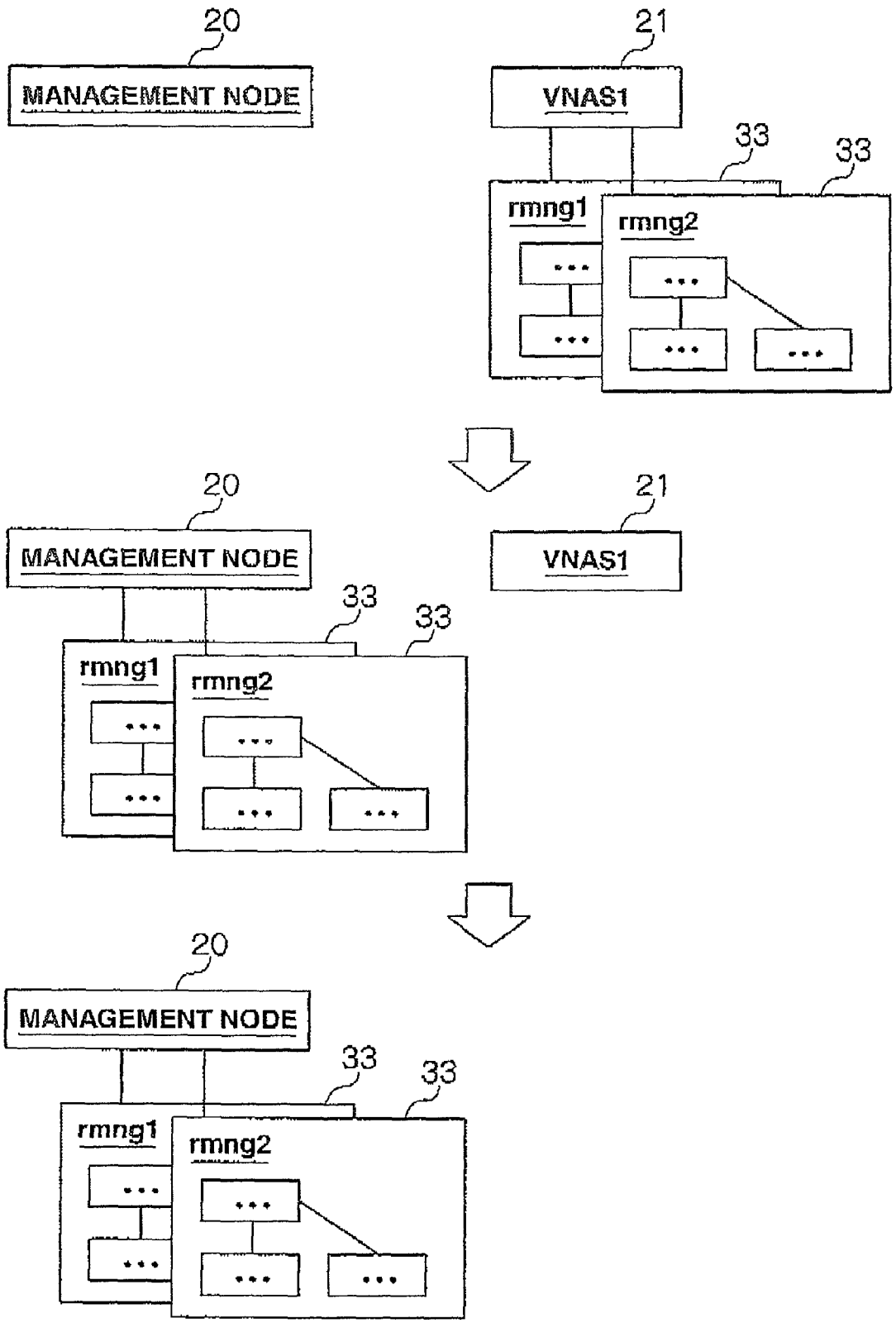
FIG. 17 is a conceptual diagram explaining the virtual NAS deletion processing.

Thereby, as shown in the upper row and middle row of FIG. 17, the resource management group 33 corresponding to the record allocated to that virtual NAS 21 is separated from that virtual NAS 21 (allocation of the deletion-target virtual NAS 21 is cancelled) in resource management group units, and the affiliation of that virtual NAS 21 is transferred from the deletion-target virtual NAS 21 to the management node 20. In connection with this, the respective resources belonging to that resource management group 33 are subsequently managed as being used by the management node 20. Therefore, these resources will not be subsequently allocated to another virtual NAS 21.

Subsequently, the CPU 10 returns to step SP11, and thereafter repeats the same processing until it obtains a positive result at step SP11.

When the CPU 10 eventually obtains a positive result at step SP11 as a result of the same processing being performed to all records extracted at step SP10, it determines whether records associated with the resource management group 33 belonging to that virtual NAS 21 other than the records associated with the resource management group 33 used by the OS 23 of that virtual NAS 21 (i.e., records associated by the resource management group 33 used by the client 2) no longer exist in the resource management table 40 (SP15).

To obtain a negative result in this determination means that a record associated with the resource management group 33 belonging to that virtual NAS 21 and which is associated with a resource management group 33 in which the last use date and time is newer than the last use date and time threshold value of step SP10 exists in the resource management table 40. Consequently, in this case, the CPU 10 ends this virtual NAS deletion processing.

Meanwhile, to obtain a positive result in the determination at step SP15 means that the management of all resource management groups 33 other than the records corresponding to the resource management group 33 used by the OS 23 of the virtual NAS 21 has been completely transferred to the management node 20. Consequently, in this case, the CPU 10 stops the virtual NAS 21 (stops the OS 23 of that virtual NAS 21) (SP16).

Subsequently, the CPU 10, as shown in the middle row and lower row of FIG. 16, changes the active information stored in the active information column 40C of the record associated with the resource management group 33 used by the OS 23 of the target virtual NAS 21 in the resource management table 40 from "active" to "inactive," and further stores the NAS_ID of the management node 20 in the NAS_ID column 40D of that record (SP17).

The CPU 10 additionally deletes records corresponding to the deletion-target virtual NAS 21 among the records of the virtual NAS management table 42 described with reference to FIG. 7 (SP18). Thereby, as shown in the middle row and lower row of FIG. 17, the virtual NAS 21 in the NAS server 5 is deleted. The CPU 10 also releases the resources that were used by the OS 23 of that virtual NAS 21. The CPU 10 thereafter ends this virtual NAS deletion processing.

(2-4) Virtual NAS Recreation Processing

Although the virtual NAS 21 manages a plurality of resources, there are cases where these resources are subject to some kind of restriction during use. Thus, when recreating a virtual NAS 21 by reusing the resource management group 33 in which the management thereof has been transferred to the management node 20, it is necessary to determine in advance regarding whether that resource management group 33 is reusable.

For example, with a LAN (Local Area Network) compatible with a standard IPv4 specification, a plurality of IP addresses can be assigned to a single network interface Nevertheless, the network may become disrupted if IP addresses belonging to different networks are allocated to the same network interface. Since the virtual NAS 21 is also a single network device when viewed from the network side, the circumstances are the same regarding matters concerning external networks. Accordingly, in order to prevent the disruption of the network, the IP address 30 (FIG. 2) sharing the NIC 12 (FIG. 2) must belong to the same network.

Figure 19:
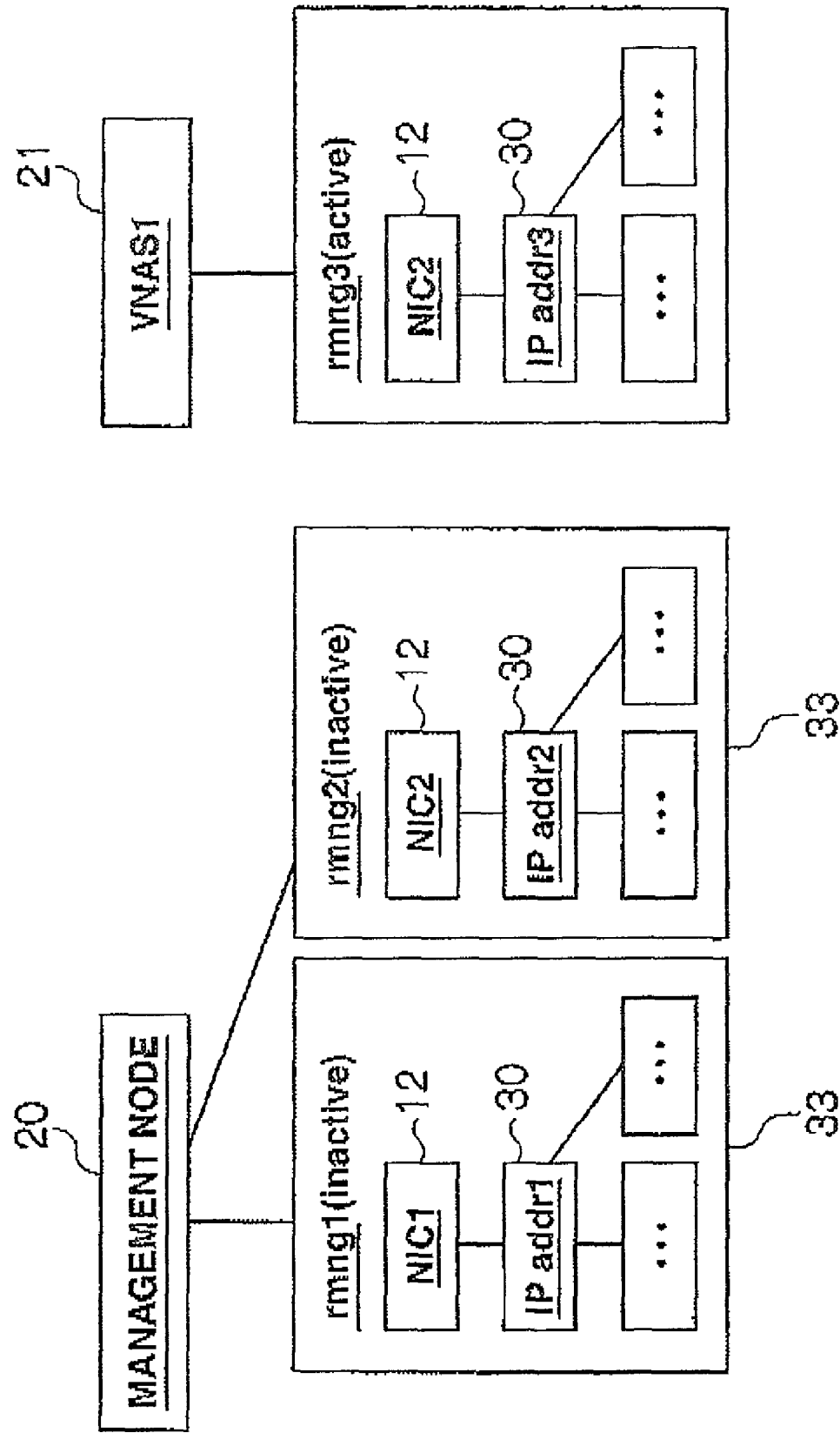
FIG. 19 is a conceptual diagram explaining the virtual NAS recreation processing.

Here, as shown in FIG. 18 and FIG. 19, let it be assumed that the resource management group 33 indicated as "rmng1" and the resource management group 33 indicated as "rmng2" belong to the management node 20, the resource management group 33 indicated as "rmng3" belongs to an active virtual NAS 21 indicated as "VNAS1," and the resource management group 33 indicated as "rmng2" and the resource management group 33 indicated as "rmng3" share the resource indicated as "NIC2."

In this status, if the "IP addr2" belonging to the resource management group 33 indicated as "rmng2" and the "IP addr3" belonging to the resource management group 33 indicated as "rmng3" do not belong to the same network, the resource management group 33 indicated as "rmng2" will conflict (conflict) with the resource management group 33 indicated as "rmng3." Thus, in this case, unless the conflict is resolved by changing the IP address 30 of the resource management group 33 indicated as "rmng2" or the like, the resource management group 33 indicated as "rmng2" cannot be reused.

Meanwhile, if the "IP addr2" belonging to the resource management group 33 indicated as "rmng2" and the "IP addr3" belonging to the resource management group 33 indicated as "rmng3" do not belong to the same network, the resource management group 33 indicated as "rmng2" will not conflict with the resource management group 33 indicated as "rmng3," and can therefore be reused.

As a method of determining the status of the foregoing conflict (hereinafter referred to as the "conflict determination method"), a method of using the association between resources can be considered. In other words, all resources registered in the resource management table 33 belong to one of the resource management groups 33. Thus, it will be possible to determine the status of conflict by following the association between the resources from the resource management group 33.

For instance, in the example of FIG. 18 and FIG. 19, when reusing the resource management group 33 indicated as "rmng2," an active resource management group 33 using the NIC 12 indicated as "NIC2" as the network interface of the resource management group 33 indicated as "rmng2" in the resource management table 33 is searched. As a result of this search, in the example of FIG. 18 and FIG. 19, the resource management group 33 indicated as "rmng3" is detected. Thus, the IP address 30 ("IP addr3") being used by the resource management group 33 indicated as "rmng3" and the IP address 30 ("IP addr2") being used by the resource management group 33 indicated as "rmng2" to be reused are compared, and whether these IP addresses 30 belong to the same network is determined. In the ensuing explanation, this kind of conflict determination method is referred to as the first conflict determination method.

Since the IP address 30 is configured from a combination of a network address for identifying the network and a host address for identifying the individual communication devices in the network, it is possible to determine whether the two IP addresses 30 belong to the same network by comparing the network addresses.

Figure 20:
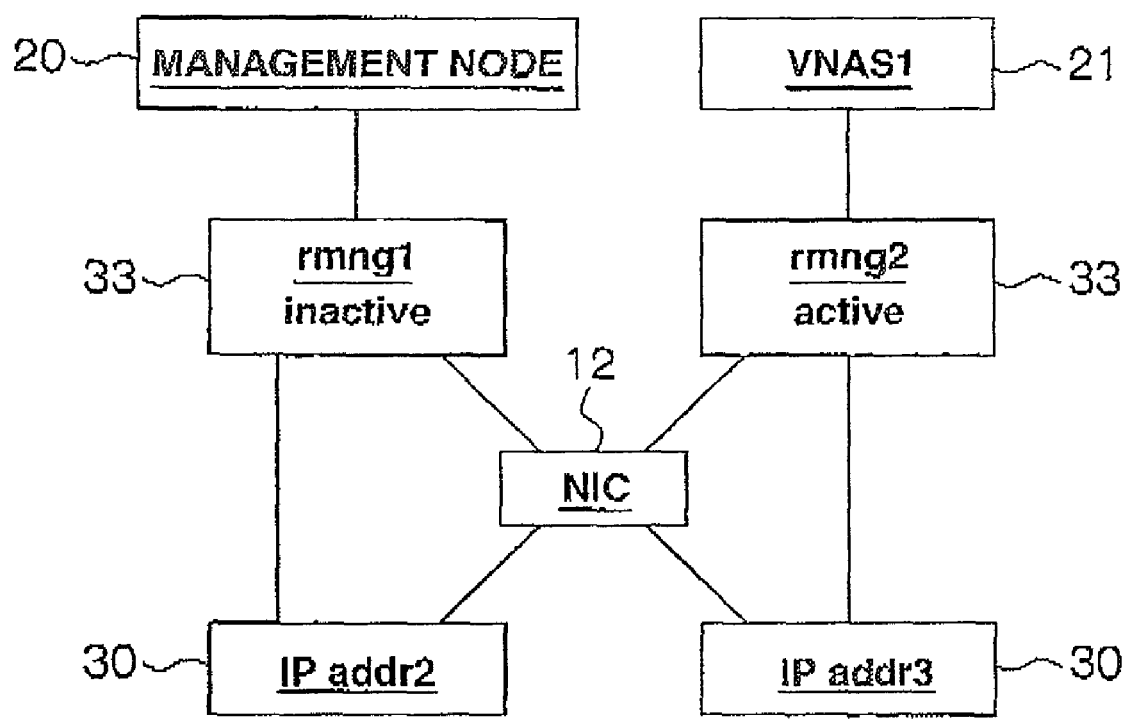
FIG. 20 is a conceptual diagram explaining the second conflict determination method.

As another conflict determination method (hereinafter referred to as the "second conflict determination method"), a method of using the association charge between resources may be considered. Specifically, in the example of FIG. 18 and FIG. 19, the association between the respective resources in the resource management group 33 indicated as "rmng2" and the resource management group 33 indicated as "rmng3" can be represented as shown in FIG. 20. In FIG. 20, the lines connecting the respective resources are the connecting lines showing that there is association between the resources on either end of that line.

In FIG. 20, since the NIC 12 indicated as "NIC2" is shared by the resource management group 33 indicated as "rmng2" and the resource management group 33 indicated as "rmng3," the "NIC2" is connected with the connecting line to both the "IP addr2" of the resource management group 33 indicated as "rmng2" and the "IP addr3" of the resource management group 33 indicated as "rmng3." Accordingly, by referring to FIG. 20, it is possible to determine that the "IP addr2" and the "IP addr3" must belong to the same network in order to reuse the resource management group 33 indicated as "rmng2."

Figure 21:
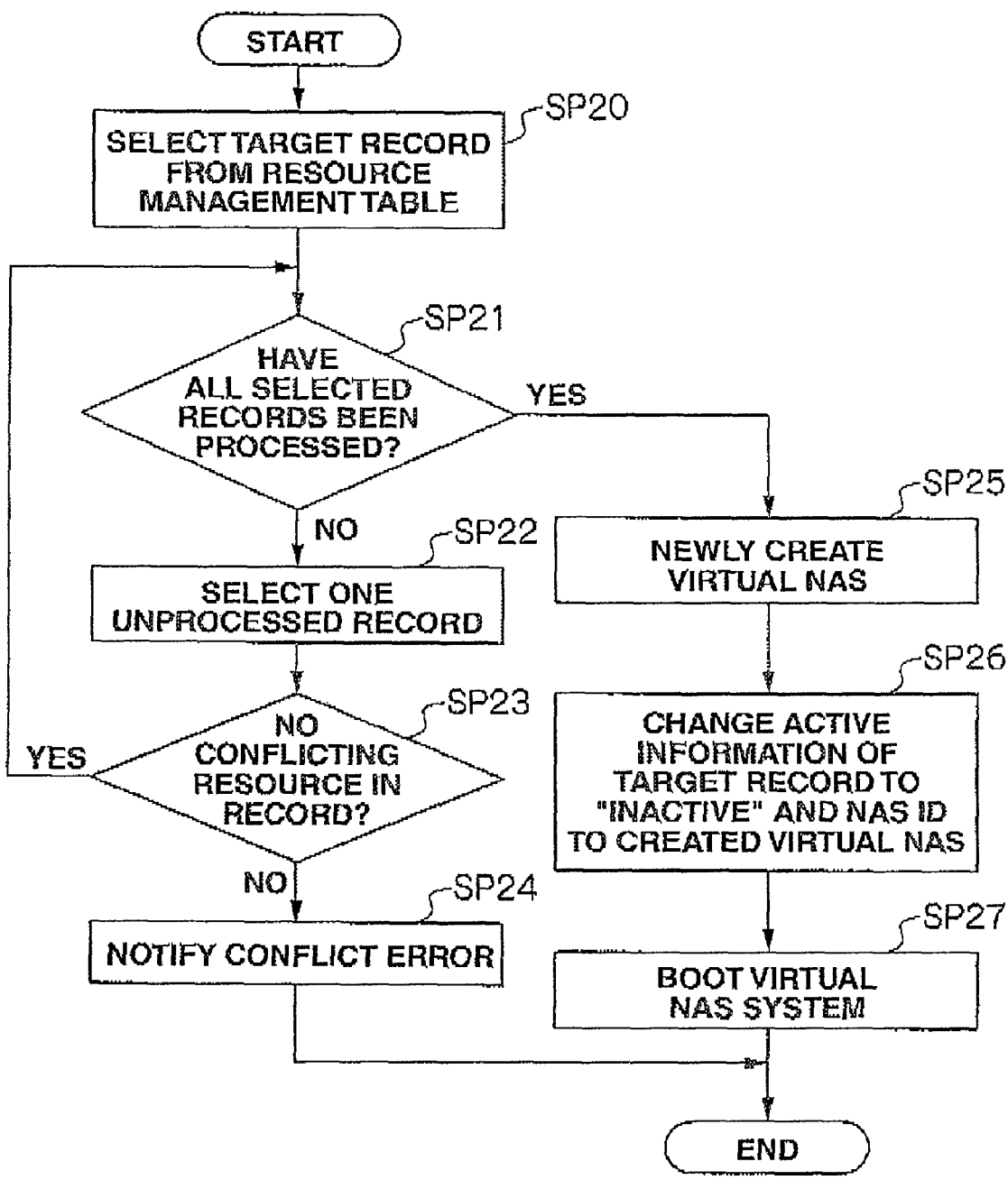
FIG. 21 is a flowchart showing the processing routine of the virtual NAS recreation processing.

FIG. 21 shows the specific processing contents of the CPU 10 of the NAS server 5 concerning the foregoing virtual NAS recreation processing.

When the user operates the management terminal 3, designates the intended virtual NAS 21 and inputs instructions for recreating such virtual NAS 21, a recreation command of that virtual NAS 21 (hereinafter referred to as the "virtual NAS recreation command") is sent from the management terminal 3 to the NAS server 5. The CPU 10 of the NAS server 5 that received this virtual NAS recreation command recreates that virtual NAS 21 in the NAS server 5 by executing the virtual NAS recreation processing shown in FIG. 21 based on the resource management program 25 (FIG. 1) of the virtual NAS 21 designated by the user as a recreation target.

Specifically, when the CPU 10 starts this virtual NAS recreation processing, it foremost selects all records corresponding to the respective resource management groups 33 (normally, the resource management group 33 that was allocated to the virtual NAS 21 before the deletion of such virtual NAS 21) designated by the user as the resource management group to be allocated to the recreation-target virtual NAS 21 among the records of the resource management table 40 (SP20). The designation of the resource management group 33 to be allocated to the recreation-target virtual NAS 21 is performed by the user using the management terminal 3. The identifier of the resource management group 33 designated here (hereinafter appropriately referred to as the "resource management group ID") is sent, together with the foregoing virtual NAS recreation command, from the management terminal 3 to the NAS server 5.

Subsequently, the CPU 10 determines whether the conflict determination processing described later with reference to step SP23 has been performed to all records that were selected at step SP20 (SP21). If the CPU 10 obtains a negative result in this determination, it selects one record that has not yet been subject to the conflict determination processing (SP22), and uses the first or second conflict determination method to determine whether there is any conflict with the other resource management groups 33 in an active status when such record is to be reused (SP23).

The CPU 10 returns to step SP21 upon obtaining a positive result in this determination. Contrarily, the CPU 10 sends an error notice to the management terminal 3 upon obtaining a negative result in this determination (SP24), and thereafter ends this virtual NAS recreation processing.

Figure 22:
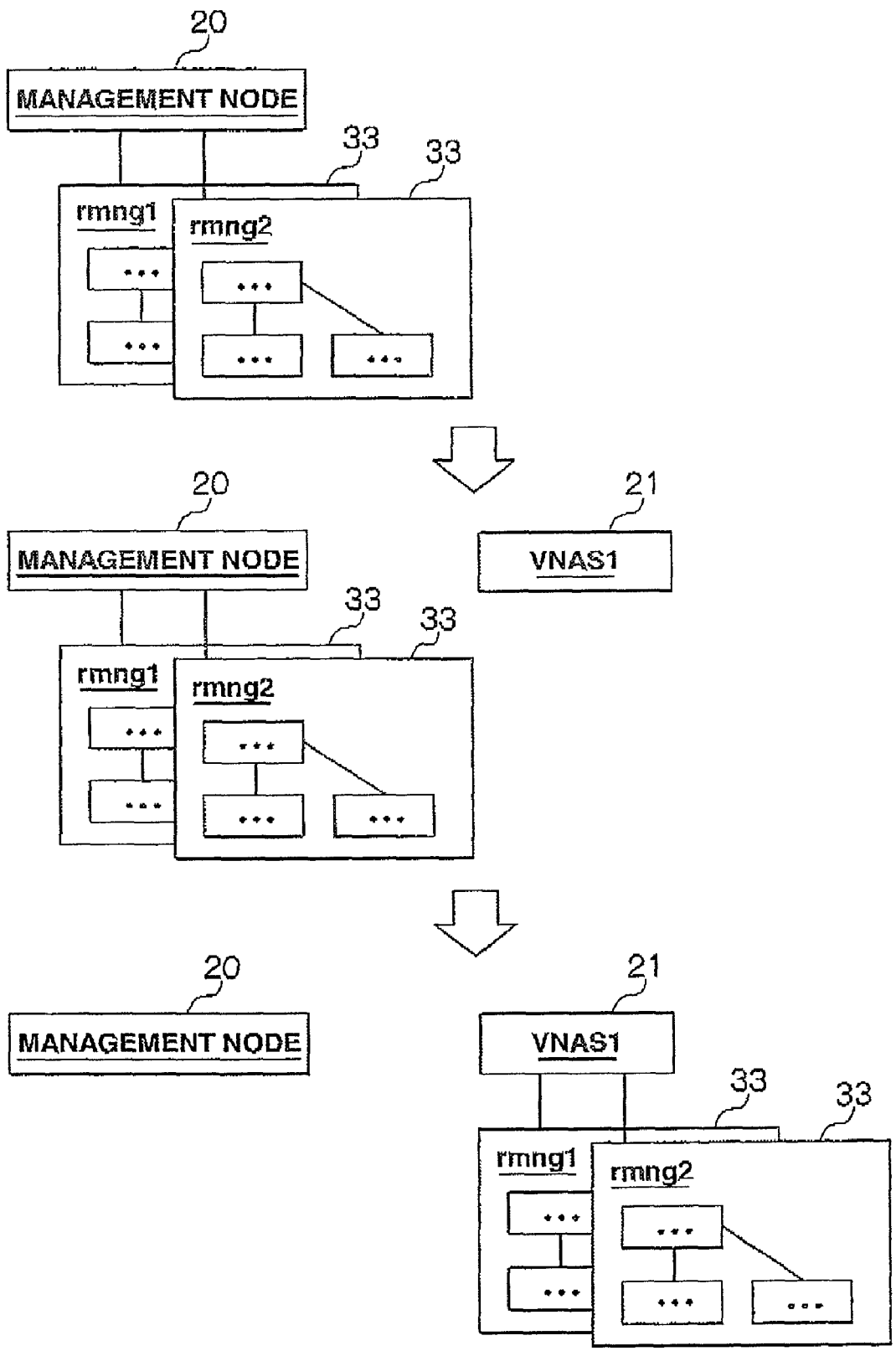
FIG. 22 is a conceptual diagram explaining the virtual NAS recreation processing.

Meanwhile, if the CPU 10 obtains a positive result at step SP21 when it is determined that there is no conflict in any of the records selected at step SP20, as shown in the upper row and middle row of FIG. 22, it newly creates the virtual NAS 21 designated by the user (SP25). Specifically, the CPU 10 allocates the logical volume designated by the user to the recreation-target virtual NAS 21 as the system logical volume 15, associates the NAS_ID of that virtual NAS 21 and the volume ID of the logical volume 15 and registers such association in the virtual NAS management table 42 explained with reference to FIG. 7.

Subsequently, the CPU 10, as shown in FIG. 23, changes the active information stored in the active information column 40C regarding the respective records selected at step SP20 in the resource management table 40 from "inactive" to "active," and also changes the NAS_ID stored in the NAS_ID column 40D from the NAS_ID of the management node 20 to the NAS_ID of the recreated virtual NAS 21 (SP26).

Thereby, as shown in the middle row and lower row of FIG. 22, the respective resource management groups 33 (including the resource management group 33 used by the OS 23) designated by the user will all belong to the recreated virtual NAS 21, and the virtual NAS 21 will thereby be able to use the resource management groups 33.

Subsequently, the CPU 10 boots the recreated virtual NAS 21 (boots the OS 23 of that virtual NAS 21) (SP27), and thereafter ends this virtual NAS recreation processing.

(2-5) Virtual NAS Reboot Processing

Normally, when a client accesses a virtual NAS, address resolution is performed based on ARP (Address Resolution Protocol). This is performed by the client broadcasting a MAC address resolution request set with the IP address of the target virtual NAS to the network. If the virtual NAS as the owner of that IP address exists on the network, that virtual NAS sends its own MAC address to the client in response to the MAC address resolution request. Consequently, the client is able to communicate with that virtual NAS based on the MAC address sent from the virtual NAS.

Thus, the management node 20 of the NAS server 5 monitors the MAC address resolution request from the client 2 and reboots the virtual NAS 21 upon detecting a given amount of the MAC address resolution request to the stopped virtual NAS 21 within a given period of time.

Figure 24:
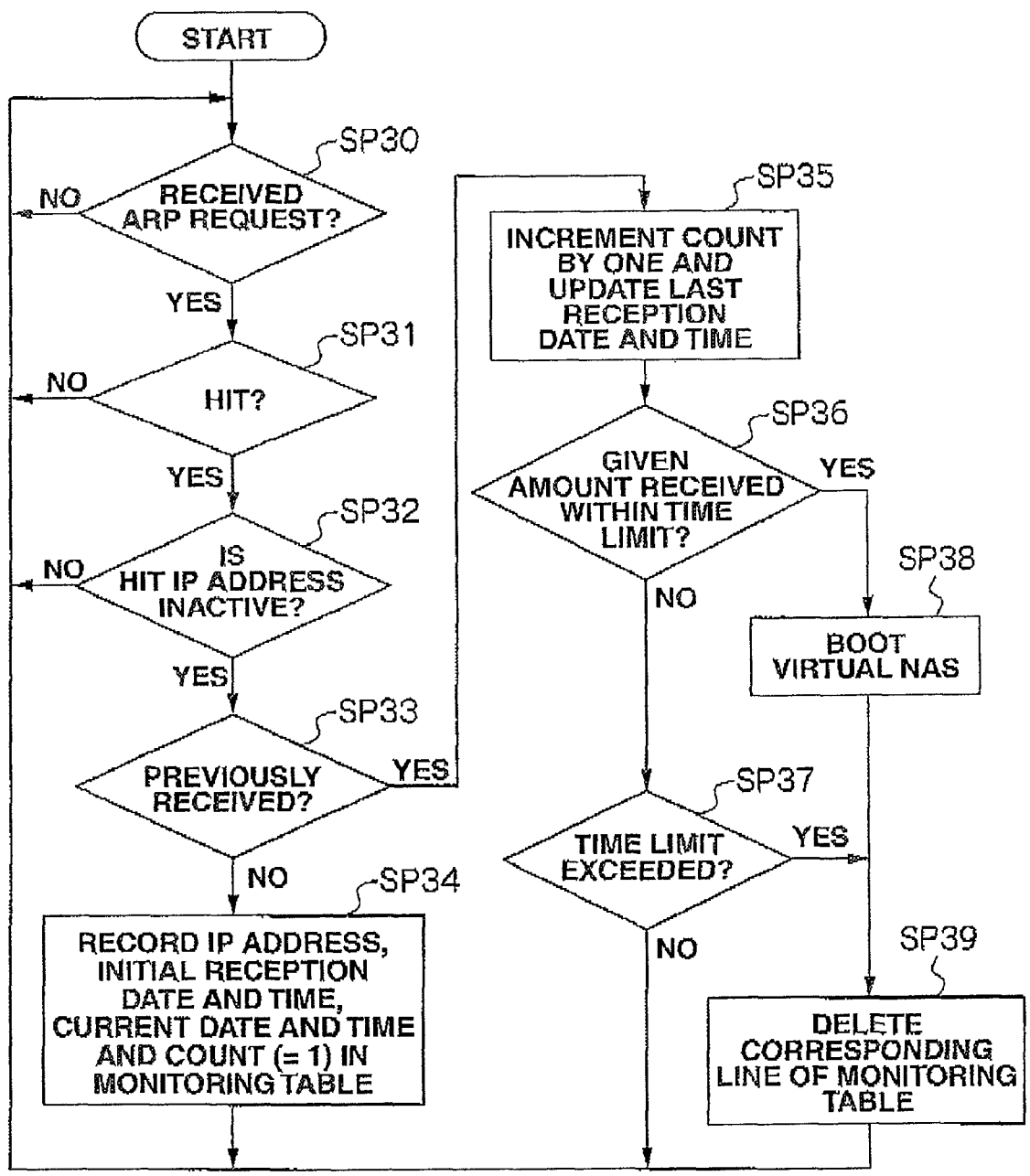
FIG. 24 is a flowchart showing the processing routine of the virtual NAS reboot processing.

FIG. 24 shows the specific processing contents of the CPU 10 of the NAS server 5 concerning this kind of virtual NAS reboot processing. The CPU 10 executes the virtual NAS reboot processing shown in FIG. 24 according to the virtual NAS management program 22 (FIG. 1) stored in the memory 11.

In other words, the CPU 10 awaits a MAC address resolution request from the client (SP30) and, upon eventually receiving the MAC address resolution request refers to the resource management table 40 (FIG. 5), and determines whether there is a resource management group 33 to which the IP address designated in the MAC address resolution request belongs (SP31).

The CPU 10 returns to step SP30 upon obtaining a negative result in this determination. Contrarily, upon obtaining a positive result in this determination, the CPU 10 refers to the resource management table 40, and determines whether the status of the resource management group 33 is inactive (SP32).

The CPU 10 returns to step SP30 upon obtaining a negative result in this determination. Contrarily, if the CPU 10 obtains a positive result in this determination, it determines whether the MAC address resolution request designating that IP address has been received previously (SP33).

As a means for realizing the above, the CPU 10 retains a monitoring table 51 as shown in FIG. 25 in the memory 11 for managing the previously received MAC address resolution requests.

This monitoring table 51 is configured from an IP address column 51A, an initial reception time column 51B, a last reception time column 51C and a count column 51D. Each time a MAC address resolution request designating a new IP address that has not been previously registered is received, the IP address thereof is stored in the IP address column 51A.

The initial reception time column 51B stores the date and time that the MAC address resolution request designating that IP address was initially received, and the last reception time column 51C stores the date and time that the MAC address resolution request designating that IP address was last received. The count column 51D stores the number of times that the MAC address resolution request designating that IP address was received.

When the CPU 10 receives a MAC address resolution request, it refers to the monitoring table 51 to determine whether a MAC address resolution request designating the IP address designated in the MAC address resolution request has been previously received. If the CPU 10 obtains a negative result in this determination, it newly registers that IP address in the monitoring table 51 (SP34).

Specifically, the CPU 10 newly stores the IP address in the IP address column 51A of the monitoring table 51, and stores the current date and time in the initial reception time column 51B and the last reception time column 51C corresponding to the IP address column 51A. The CPU 10 additionally stores "1" as the count value in the count column 51D.

The CPU 10 thereafter returns to step SP30, and awaits the reception of the next MAC address resolution request (SP30).

Meanwhile, if the CPU 10 obtains a positive result in the determination at step SP33, it increments the count value stored in the count column 51D of the record corresponding to the monitoring table 51 by "1" (SP35), and thereafter determines whether the count value stored in the count volume 51 of that record has exceeded a predetermined threshold value (SP36).

If the CPU 10 obtains a positive result in this determination, it boots the virtual NAS 21 corresponding to that record (SP38), deletes that record of the monitoring table 51 (SP39), and thereafter returns to step SP30.

Meanwhile, if the CPU 10 obtains a negative result in the determination at step SP36, it determines whether the elapsed time from the initial reception time stored in the initial reception time column 51B of that record in the monitoring table 51 to the current time has exceeded a predetermined threshold value (SP37).

The CPU 10 returns to step SP30 upon obtaining a negative result in this determination. Contrarily, if the CPU 10 obtains a positive result in this determination, it deletes the target record from the monitoring table 51 (SP39), and thereafter returns to step SP30.

(3) Effect of Present Embodiment

As described above, with the information processing system 1 according to the present embodiment, since the association between resources that is not based on the user's setting is extracted according to the data access from the client 2 and the associated resource management groups 33 are integrated based on the extracted result, it is possible to reduce the number of resource management groups to be managed, and resource management is thereby facilitated.

In addition, with the information processing system 1 according to the present embodiment, since the management of the respective resource management groups 33 is consolidated in the management node 20 of the NAS server 5, it is not necessary to perform resource management for each virtual NAS 21, and resource management can be facilitated even further.

(4) Other Embodiments

Although the foregoing embodiment explained a case of applying the present invention to the NAS server 5 configured as shown in FIG. 1, the present invention is not limited to this configuration, and can be broadly applied to management apparatuses of various configurations that manage resources allocated to a virtual node that provides a file sharing service to the client 2 in units of a resource management group 33 configured from a plurality of mutually associated resources. Accordingly, the management apparatus may also be provided separately from the NAS server 5.

Moreover, although the foregoing embodiment explained a case of configuring an association extraction unit for extracting an association between the resources based on history information (respective access logs stored in the access log management table) of access from the client 2, an integration unit for integrating the associated resource management groups 33 based on the association between the resources extracted with the association extraction unit, and a management unit for consolidating the respective resource management groups 33 with a single management node 20, the present invention is not limited to this configuration, and the association extraction unit, the integration unit and the management unit may also be provided as individual nodes.

Further, although the foregoing embodiment explained a case of configuring the resource management table 40 for managing the resources to be allocated to each virtual NAS 21 as shown in FIG. 5, the present invention is not limited to this configuration, and various other configurations may be broadly applied.

The present can be broadly applied to NAS servers as well as management apparatuses that manage resources allocated to a virtual node that provides a file sharing service to a client in units of a resource management group configured from a plurality of mutually associated resources.

What is claimed is:

1. A management apparatus for managing computing resources comprising:
    a NAS server, which is operative to store management information in at least a resource management table, which manages a plurality of resource groups formed by a plurality of resources included in the resources, and a resource association table, which indicates an association among the resources,
    comprises a logical block for said management apparatus and at least one logical block for a virtual NAS, and
    is communicatively coupled to a storage apparatus and at least one client, said resources being allocated to the virtual NAS serving as a virtual node that provides a file sharing service to said at least one client in units of a resource management group configured from a plurality of mutually associated resources,
    an association extraction unit for:
    acquiring an access log from the client;
    analyzing said acquired access log and counting a number of times each of a plurality of resource pairs occurs, each resource pair being formed by two resources included in the resources;
    extracting a resource pair whose number of times exceeds a first threshold value and which includes a first resource and a second resource; and
    adding the extracted resource pair to the resource association table; and
    an integration unit for:
    integrating a first resource group, which includes the first resource, and a second resource group, which includes the second resource, and integrating first information related to the first resource group in the resource management table and second information related to the second resource group in the resource management table.

2. The management apparatus according to claim 1, further comprising a management unit for consolidating respective resource management groups.

3. The management apparatus according to claim 2, wherein, upon separating a resource allocated to a node from the node, the management unit separates the resource from the node in the resource management group units.

4. The management apparatus according to claim 2, wherein, upon deleting a node, the management unit does not release the resource management group to be used in the access of the client and releases the resource management group to be used by the system of the node among the resource management groups allocated to the node.

5. The management apparatus according to claim 2, wherein, upon recreating a node, the management unit determines whether the resources contained in the resource management group to be allocated to the node conflicts with the resources contained in the resource management group to be used by another node, and allocates the resource management group to the node when the resources do not conflict.

6. A management method for managing computing resources with a management apparatus comprising:
    in a NAS server that is configured for storing management information in at least a resource management table, which manages a plurality of resource groups formed by a plurality of resources included in the resources, and a resource association table, which indicates an association among the resources;
    communicatively coupling said NAS server, said management apparatus to a storage apparatus and at least one client, said resources being allocated to the virtual NAS serving as a virtual node that provides a file sharing service to a client in units of a resource management group configured from a plurality of mutually associated resources;
    establishing by said NAS server, a logical block for said management apparatus and at least one logical block for a virtual NAS;
    and
    operating said management apparatus for:
    acquiring an access log from the client,
    analyzing said acquired access log and counting a number of times each of a plurality of resource pairs occurs, each resource pair being formed by two resources included in the resources;
    extracting a resource pair whose number of times exceeds a first threshold value and which includes a first resource and a second resource; and
    adding the extracted resource pair to the resource association table; and
    in an integration unit:
    integrating a first resource group, which includes the first resource, and a second resource group, which includes the second resource, and integrating first information related to the first resource group in the resource management table and second information related to the second resource group in the resource management table.

7. The management method according to claim 6, wherein the respective resource management groups are consolidated.

8. The management method according to claim 7,
wherein, upon separating a resource allocated to a node from the node, the resource is separated from the node in the resource management group units.

9. The management method according to claim 7,
wherein, upon deleting a node, the resource management group to be used in the access of the client is not released and the resource management group to be used by the system of the node is released among the resource management groups allocated to the node.

10. The management method according to claim 7,
wherein, upon recreating a node, whether the resources contained in the resource management group to be allocated to the node conflict with the resources contained in the resource management group to be used by another node is determined, and the resource management group is allocated to the node when the resources do not conflict.

* * * * *